United States Patent [19]

Truong et al.

[11] Patent Number: 5,793,378
[45] Date of Patent: Aug. 11, 1998

[54] IMPLEMENTATION FOR HIGH SPEED ARBITRARY ANGLE OF ROTATION

[75] Inventors: Thanh D. Truong, Walnut; Vinod Kadakia, Rancho Palos Verdes, both of Calif.

[73] Assignee: Xerox Corporation, Stamford, Conn.

[21] Appl. No.: 620,186

[22] Filed: Mar. 22, 1996

[51] Int. Cl.⁶ .......................................... G06T 3/00
[52] U.S. Cl. .......................................... 345/437
[58] Field of Search ..................... 395/137, 133, 395/118, 515–517, 522–526; 345/433, 437, 418, 515–517, 522–526

[56] References Cited

U.S. PATENT DOCUMENTS 5,412,768  5/1995  Ozaki .......................... 395/137

*Primary Examiner*—Almis R. Jankus
*Attorney, Agent, or Firm*—Robert Cunha

[57] ABSTRACT

A circuit for rotating a digital image through any angle at the rate of one pixel per clock period. First, the circuit divides the image to be rotated into blocks which can be rotated without pause once each is started. Then a nearest neighbor calculating circuit is used to determine the value of each rotated pixel in the block. The circuit is divided and pipelined so that each part can produce its output in one clock cycle. The nearest neighbor calculation is done in two sections of the circuit, and other sections of the circuit set up initial conditions or provide for transitions from one rotated scan line, or block, to the next.

3 Claims, 7 Drawing Sheets

IMPLEMENTATION FOR HIGH SPEED ARBITRARY ANGLE OF ROTATION

BACKGROUND OF THE INVENTION

A method for rotating a digital image through any angle at the rate of one pixel per clock cycle.

It is a common requirement in the printing industry that an image must be rotated. Some reasons are that the image was not properly positioned on the platen while it was being scanned, the image was scanned in the protrait mode and must be printed in the landscape mode, and that the image must be rotated for artistic reasons. Further, the decision to rotate is frequently made at a time and place where the original is not available. Thus, there is a need to be able to digitally rotate the image in the printer.

This is a computationally intensive process. Consider that each pixel may have a number of bits, and that a rotated pixel normally will fall between the original row and column scan lines. The result is the necessity of computing the value, as well as the position, of each new pixel from its nearest neighbors.

Also, the number of pixels in an image is very large. At 600 pixels per inch, there will be 30 million on a standard page. To rotate the image in a realistic amount of time, it is imperative that the pixels be converted at the rate of one per clock cycle.

SUMMARY OF THE INVENTION

The circuit used to rotate an image according to the principles of this invention must perform according to two principles. First, the data must be processed in blocks, the advantage being that once a block is set up, the processing can go on without interruption until the entire block is processed. With respect to the size of this block, a larger block size would be better in that fewer block handling operations would be required for a given image size. However, a larger block size demands a greater amount of storage at several places in the circuit. In the disclosed embodiment, 32 bits is the word size and a 32 by 32 pixel data block is the block size for 45 degree rotations. Other block sizes will also be discussed.

Second, the circuit for performing the nearest neighbor calculation must be divided into circuit elements, each of which will produce its output in one clock cycle. Then, by pipelining, the throughput of the entire circuit is one pixel per clock cycle. The circuit tasks are:

1. load the x and y values of a non-rotated pixel as the starting point.
   a. load starting x, y position for output rotated image.
   b. load delta x and delta y to determine the next output position of the current line.
   c. load delta x' and delta y' to determine the new output position of the next line.
2. add delta x and delta y to the previous rotated pixel location to determine the next position of the current rotated pixel.
3. determine the value of the rotated pixel from its four nearest neighbors, and
4. check for the various boundary conditions before returning to task 2 for the next iteration.

To guarantee full performance, logic circuits to perform word alignment and generate background data are also implemented.

DETAILED DESCRIPTION OF THE INVENTION

Figure 1:
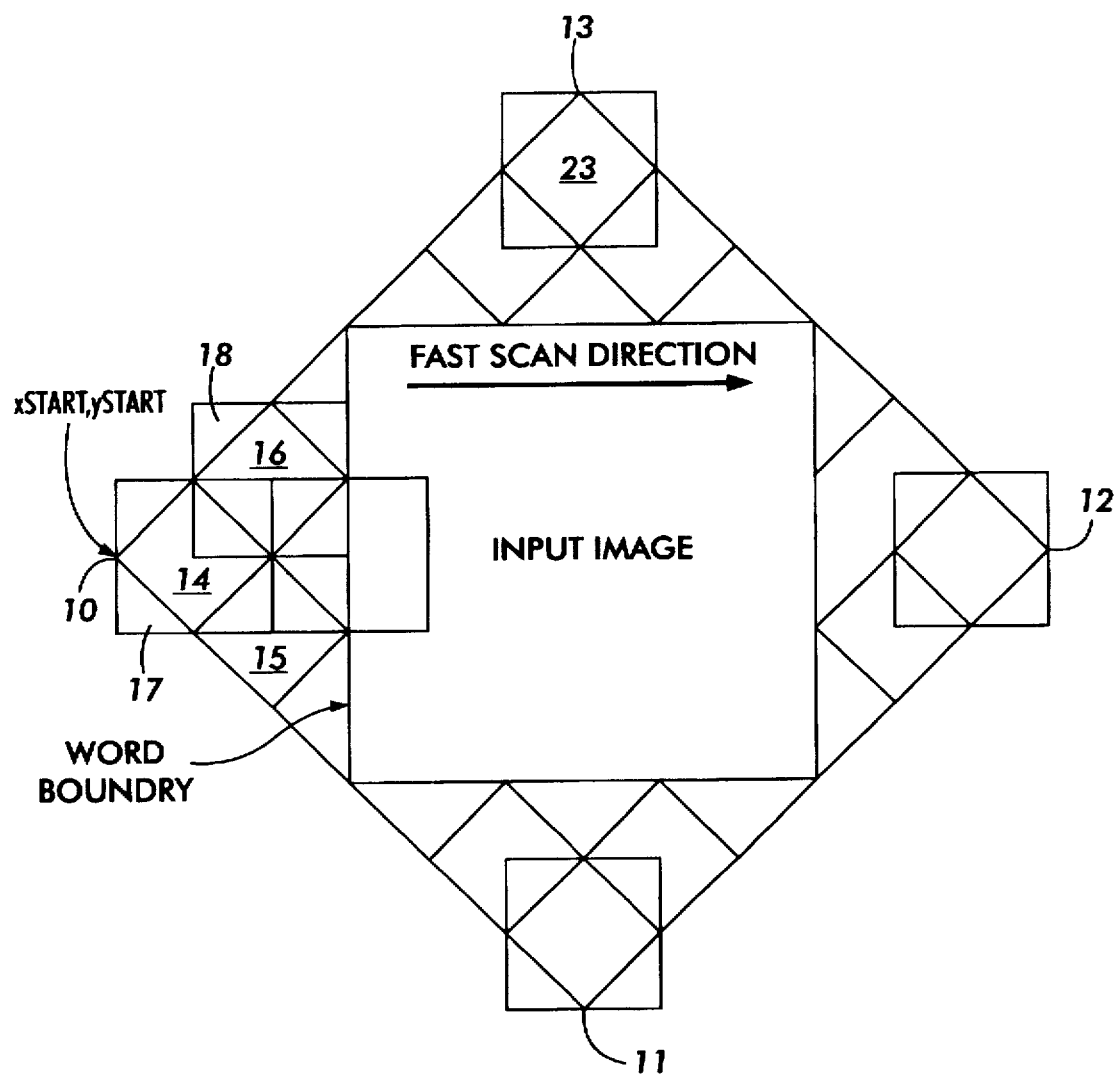
FIG. 1 shows the original image and the segmentation of the rotated image into blocks.
Figure 3:
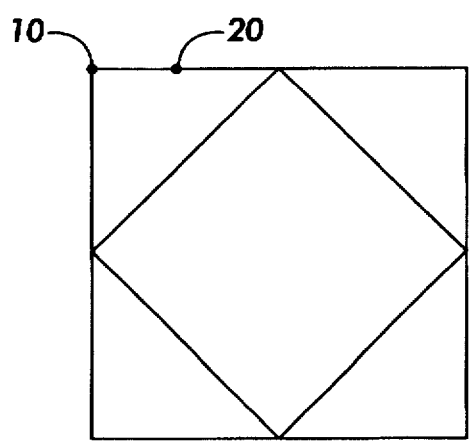
FIG. 3 shows the original image of FIG. 1, with horizontal scan lines, after rotation.

FIG. 1 shows the original image consisting of horizontal scan lines as a shaded area on a white background. Assume that it will be rotated 45 degrees. Then, the final image would be as shown in FIG. 3, where there is an angled image consisting of horizontal scan lines within a larger area, and where the corners of the larger area are filled with the white background. It can therefore be seen that the area to be rotated in FIG. 1 is actually the larger area bounded by points 10, 11, 12 and 13. Note that neither the original image nor the larger area must be square.

Figure 2:
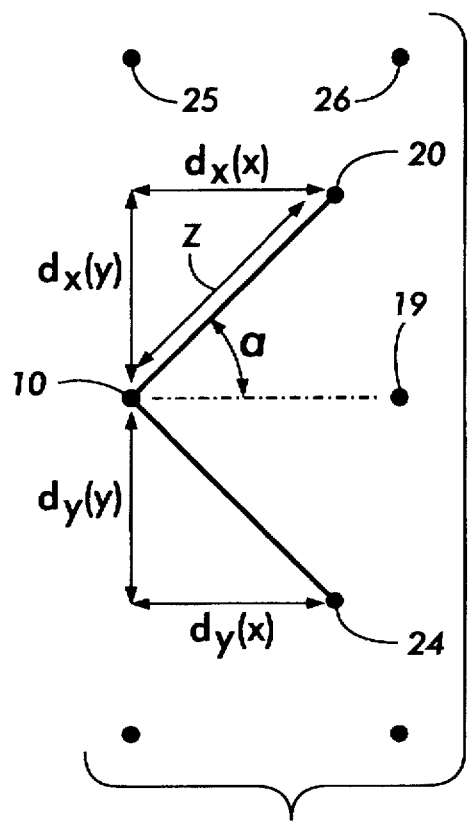
FIG. 2 is an exploded view of the area surrounding point 10 of FIG. 1.

To be rotated, the entire larger area of FIG. 1 is divided into input blocks 14, 15, 16, etc., each within a larger data block, 14 within 17, 16 within 18, etc. Within each of these overlapping data blocks are the locations of original pixels in horizontal rows and vertical columns, four of which are shown as pixels at points 10, 25, 26 and 19 of FIG. 2. As shown, there is a diagonal distance z between rotated pixels 10 to 24, and 10 to 20. To arrive at the location of the first rotated pixel 20, a pointer starting at point 10 will have to travel a distance dx(x) horizontally and dx(y) vertically to arrive at point 20, which is a direct distance z from point 10 in the direction of the rotated angle a. Note that in this figure, the distance between original or rotated pixels in the x direction can be different from the distance in the y direction, so that the distance between points 10 and 19 is smaller than the distance between points 10 and 25. In other words, this system will work where the densities in the x and y directions are different for either rotated or unrotated pixels. Also, there is no requirement that the input and output pixel densities need be the same, magnification and minification are accomplished by making the distances dx(x) and dx(y) between the output pixels larger or smaller.

To rotate point 20, two things must be determined. First is its position after rotation. Knowing that point 10 of FIG. 1 must be located at the upper left corner of the rotated image of FIG. 3, then, by inspection, it is clear that after a 45 degree clockwise rotation, point 20 of FIG. 2 must be located a distance z to the right of the start point 10 of FIG. 3.

Figure 4:
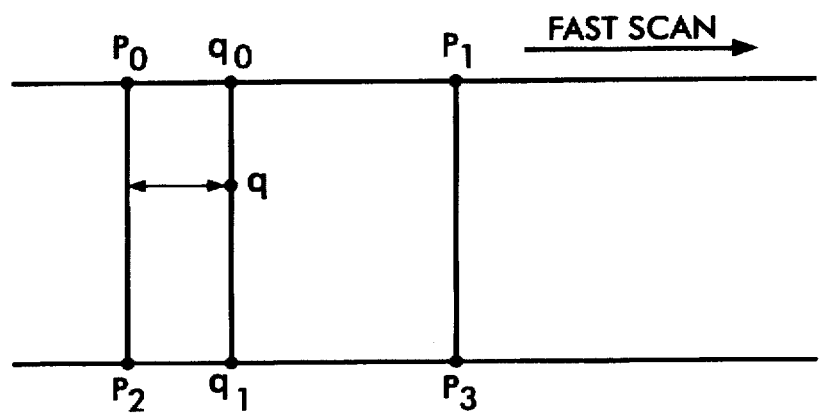
FIG. 4 shows the spatial relationship of the points used in the nearest neighbor interpolation.

The other determination is the value of the pixel, and this can be done in accordance with the ususal nearest neighbor calculation as shown in FIG. 4. Within the image, knowing the values of $P_0$ and $P_1$, the value of $q_0$ can be calculated based on the distances from $q_0$ to $p_0$ and $p_1$. The same calculation is repeated to find the value of $q_1$ from $P_2$ and $p_3$, and finally repeated to find q from $q_0$ and $q_1$. After determining the value of the pixel at point 20 of FIG. 2, the process moves another delta x and y and repeats the process for the next pixel in the rotated line, or segment.

Figure 5:
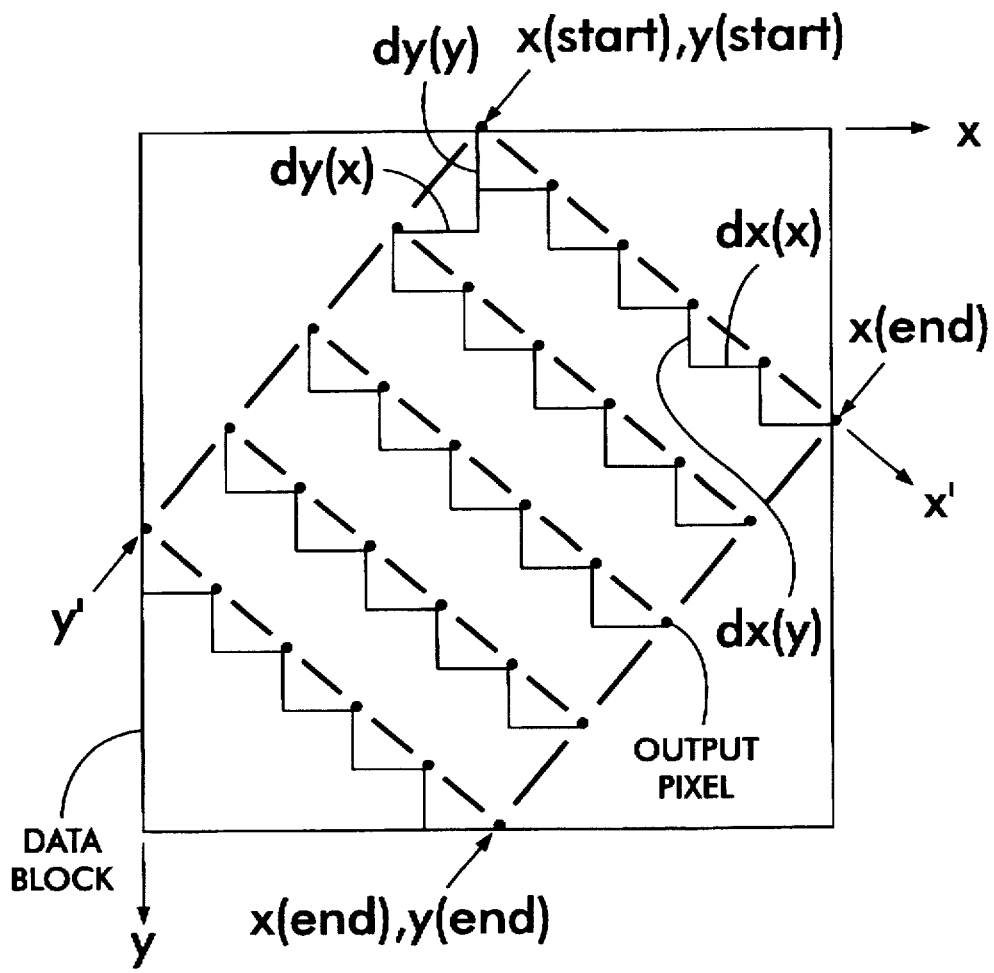
FIG. 5 shows the sequence by which all of the pixels in an input data block are processed.

After the first rotated segment is completed, see FIG. 5, the process goes on to the next segment. In FIG. 5 the input block is 6 by 5 pixels. The pixels of the data block are not shown, and any realistic number can be assumed. In this case, the process will start at the top of the inner rectangle, x(start), y(start), the lines proceed down and to the right in increments of dx(x) and dx(y) and finish at x(end), and a CCW 45 degree rotation is assumed. From the first x(start), y(start) pixel, the process adds dx(x) to x(start) and dx(y) to y(start) to determine the location of the next pixel in the segment (line). The process is then continued to finally produce pixel x(end). Next, dy(x) and dy(y) are added to x(start), y(start) to locate the first pixel of the next segment, and the next segment is processed with , again, increments of dx(x) and dx(y). Finally, the pixel at x(end),y(end) is reached, and the process will go to the next block.

The actual circuit operation proceeds in a number of steps, each capable of being accomplished in one clock cycle, as follows:

Step 0: x=x(start), y=(y)start.

(The starting point of the block is loaded. The comma indicates that the two operations proceed in parallel.)

Step 1: Unload wx and wy from lookup tables using x and y as the address, (If there is a completely linear relationship between the input and output values of the pixels, wx=wy=1 and this step can be eliminated. If, however, there is any kind of image edge enhancement that is based on a nonlinear relationship between the input and output values, these look up tables will contain the desired correction.) set nxtseg_x=x and nxtseg_y=y.

(This sets the next segment location to the starting point of the first segment, which will eventually be the first scan line of the rotated image.)

Step 2: calculate $q_0=(p_0-p_1)*wx+P_1$, $q_1=(p_2-p_3)*wx+p_3$
(This is the calculation of $q_0$ and $q_1$, of FIG. 4.)

Step 3: $q=(q_0-q_1)*wy+q_1$.
(This is the calculation of q of FIG. 4.)

x=x+dx(x),y=y+dx(y).

(This locates the next pixel in the segment to be generated.)

if the last pixel calculated was not the last pixel of the segment, go back to step 2.

Step 4: If the current segment is the first segment of the block, x=nxtseg_x+dy(x), y+nxtseg_y(y)+dy(y), nxtbk_x=x, nxtbk_y=y (This sets up the process to the first pixel of the next segment.)

go back to step 2

Step 5: If not the first or last segment of the block, x=nxtseg_x+dy(x), y=nxtseg_y+dy(y) (go to beginning of next segment), and go back to step 2

Step 6: (Last segment of the block finished)

if last block: Done, if not last block, x=nxtbk_x, y+nxtbk_y, go back to step2, if last block and not last row, x=nxtseg_x+dy(x), y=nxtseg_y+dy(y) (go to next block)

Figure 6:
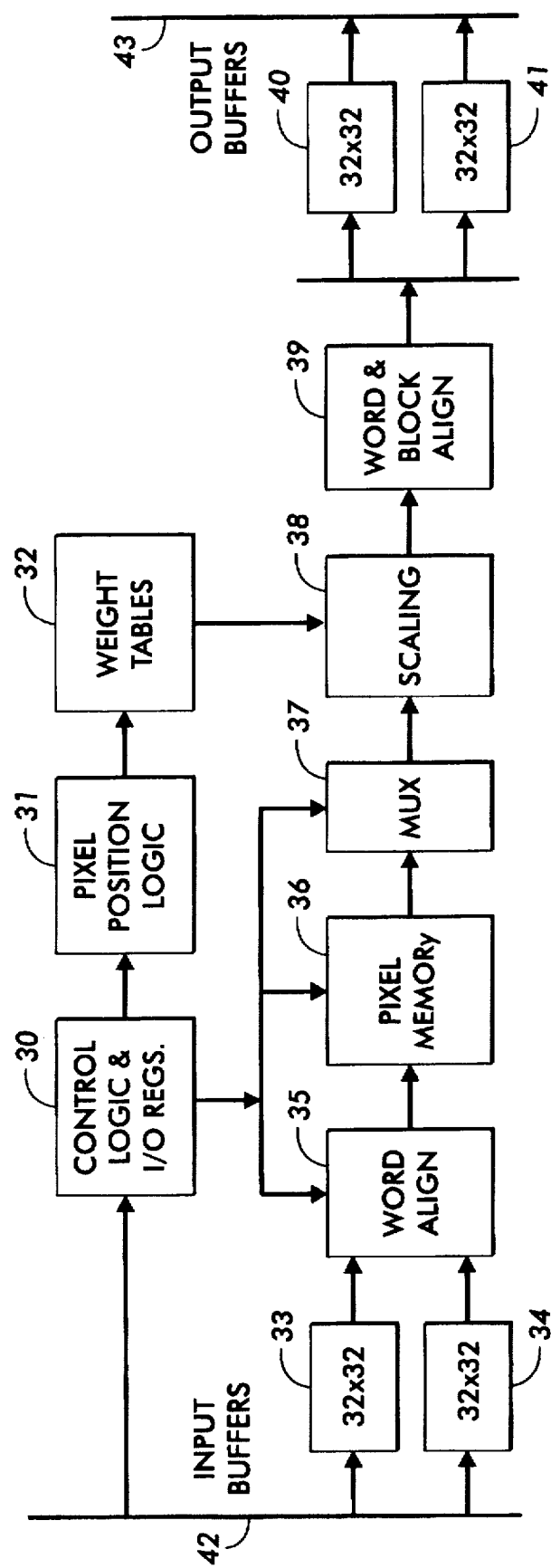
FIG. 6 is a block diagram of the circuit.

FIG. 6 is a diagram of the circuit. Bus 42 is a data source and supplies data blocks of the original image to input buffers 33, 34. Storage for two data blocks are shown but from as many as five may be needed for an actual rotation. For example, if an input block is entirely within one data block, then one data block is loaded. If the input block overlaps a word boundary in the horizontal direction, two data blocks will have to be fetched from memory and stored to provide a final, aligned, 32 by 32 pixel data block. If the input block overlaps both horizontal and vertical word boundaries, then four data blocks may be needed. Finally, if the input block is an elongated rectangle, up to five data blocks may be needed.

Figure 7:
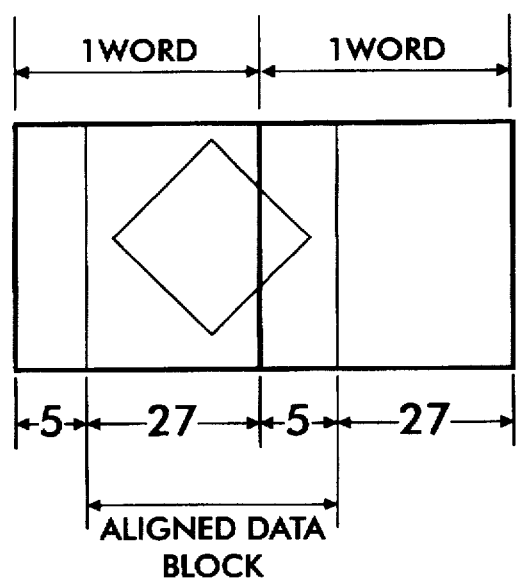
FIG. 7 shows how the content of two data blocks are used to form one aligned data block.

Assuming that the required data blocks are in the buffers, then the word alignment is accomplished in word align circuit 35. This circuit operates as shown in FIG. 7 where a fraction of the lines from each input buffer 33, 34 are shifted into the word align circuit so that the input block will be completely within the aligned data block. Note that every input block in the image will have to be shifted exactly the same amount. To use the numerical example of FIG. 7, if a first aligned data block must be generated from the last 27 columns of one data block and the first 5 columns of the next data block, then that will be true for every other aligned data block in the image. At this point, each original pixel has its own value, and the remainder of the circuit will, among other things, compute output pixel values from these. However, if the pixels in question are background pixels, then values for these will be output under control of the control logic 30. Constant color and halftones are possibilities.

In FIG. 6, the logic block 30 receives instructions on how this word align operation should proceed, and for the duration of the image, controls the word align circuit 35 to produce the required shift.

The entire aligned data block is then loaded into the pixel memory 36, which is divided into four parts, each of which supplies a pixel, corresponding to $p_0$ $P_1$, $P_2$ and $p_3$ through multiplexer 37 to the scaling circuit 38 which applies the enhancement factor w from the weight table 32, if necessary, and calculates the values of $q_0$ and $q_1$. If the weights are used, the table 32 is loaded and addressed from the pixel position logic 31 and addressed by the 8 bit value of the output pixel q.

Next, within the scaling circuit 38, on the next clock cycle, the 8 bit value of q is calculated from $q_1$ and $q_2$. Finally these 8 bit output pixels are packed into 32 bit words in align circuit 39 and output through ping pong buffers 40 to the output data bus 43.

Figure 8:
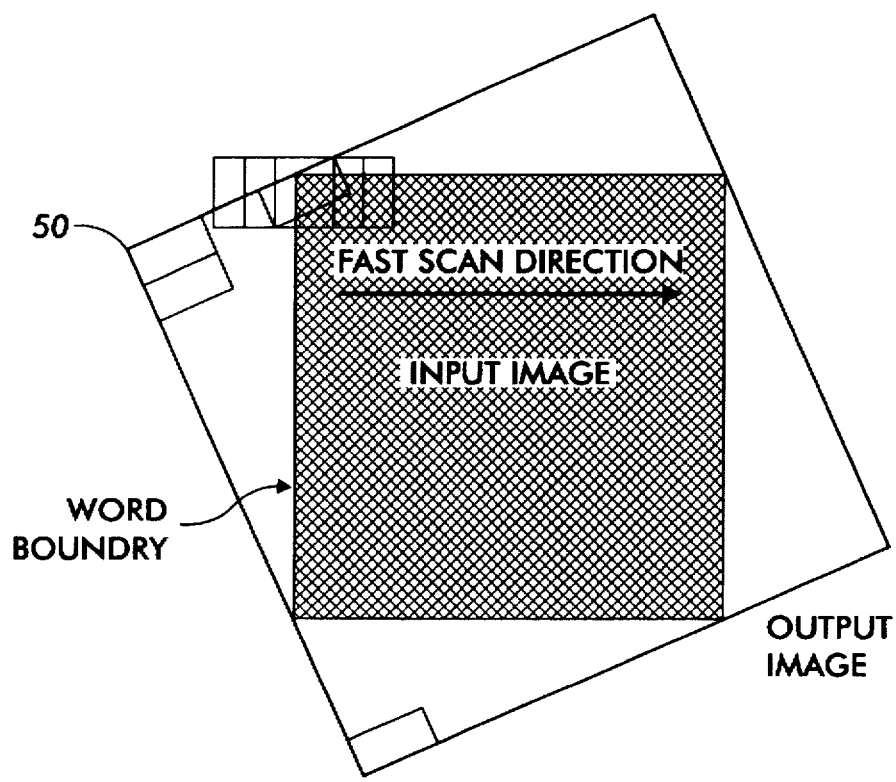
FIG. 8 shows the arrangement of 32 by 64 pixel blocks used in a small CW angle of rotation.
Figure 9:
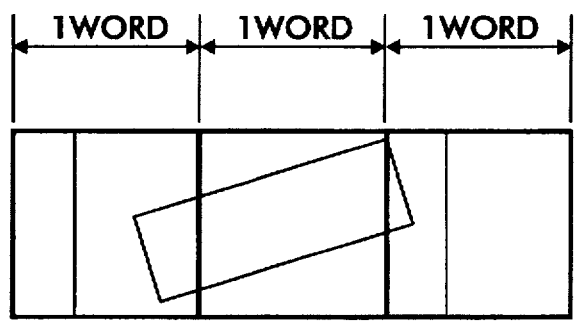
FIG. 9 shows how three data blocks are used to create one aligned data block.
Figure 10:
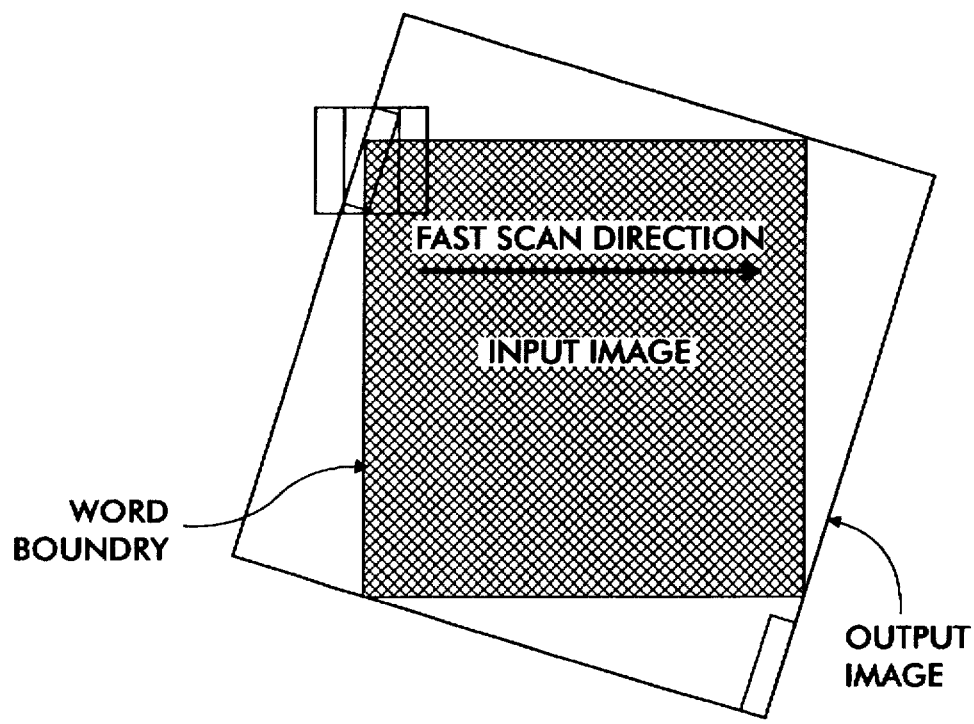
FIG. 10 shows the arrangement of 32 by 64 pixel blocks used in a large CW angle of rotation.
Figure 11:
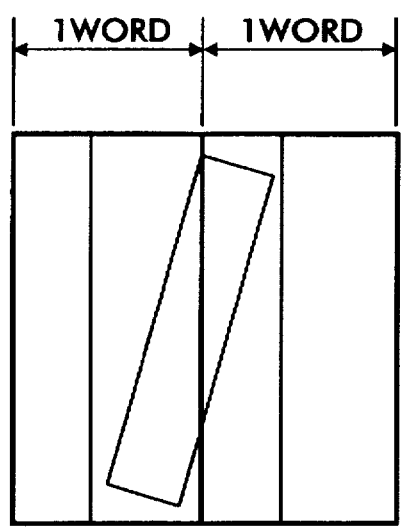
FIG. 11 shows how four data blocks are used to create one aligned data block.

In case of a rotation that is close to any multiple of 90 degrees, the use of a 32 by 64 bit aligned block is more efficient since it allows a greater amount of the image to be processed within one block. FIG. 8 shows the process involved in a CW rotation through a small angle. The process, as before, starts at the leftmost point 50 of the larger rectangle, and proceedes through a rectangle that is 32 by 64 pixels. FIG. 9 shows how three data blocks are used to form one 32 by 64 pixel aligned block. Similarly FIGS. 10 and 11 show a block for use in a CW rotation of almost 90 degrees. For very small angles an aligned block size of 16 by 128 pixels can be used.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A circuit for producing a series of rotated output pixels formed into a number of lines from an aligned block of unrotated input pixels, one output pixel being produced as a circuit output during each previous, current and next clock period, comprising:

a buffer for storing the block comprising the input pixels to be rotated, and for outputting from said buffer the four nearest neighbor pixels p0, p1, p2 and p3 of an output pixel during every clock period, the process proceeding line by line of output pixels, from the first output pixel of the first line to the last output pixel of the last line of the block, first means responsive to the output of said buffer at the end of the previous clock period for, using a nearest neighbor calculation to generate and output an intermediate value q0 from original nearest neighbor input pixels p0 and p1 output during the previous clock period, and in parallel, using a nearest neighbor calculation to generate and output an intermediate value q1 from original nearest neighbor input pixels p2 and p3 output during the previous clock period, during each clock period, and second means responsive to the output of said first means at the end of the previous clock period for using the nearest neighbor calculation to generate and output a final value q from said intermediate values q0 and q1 generated during each clock period.

2. The circuit of claim 1 further comprising means for assembling a number of output pixels into an output image raster.

3. The circuit of claim 1 further comprising means for producing said aligned block by accessing two original image blocks which contain said aligned block of input pixels and shifting the input pixels so that all of the input pixels are in the single aligned block.

* * * * *